3,177,190
PREPARING AND CURING COMPOSITIONS OF TERMINALLY REACTIVE POLYMERS
Henry L. Hsieh, Bartlesville, Okla., assignor to Phillips Petroleum Company, a corporation of Delaware
No Drawing. Filed June 14, 1961, Ser. No. 117,238
14 Claims. (Cl. 260—94.2)

This invention relates to a method of preparing compositions of terminally reactive polymers. In another aspect, it relates to the method of preparing and curing polymeric compositions which are self-plasticized.

In the copending application Serial No. 772,167, now U.S. Patent Number 3,135,716, of Uraneck, Short, Hsieh and Zelinski, filed November 6, 1958, it is disclosed that highly useful polymeric products can be obtained by polymerizing vinylidene-containing monomers in the presence of an organo alkali metal catalyst and subsequently reacting the resulting polymer containing alkali metal end groups with a reagent which replaces the alkali metal with more stable reactive end groups. These polymers can then be cured by reaction with polyfunctional organic compounds reactive with the end groups of the polymer. The reactive terminal substituents on the polymer molecules enable a more effective cure since all of the polymer molecule can be tied into the cross-linked structure. The term "telechelic" has been coined to define these terminally reactive polymers and, as used in this specification, the term "telechelic polymer" means a polymer of vinylidene-containing monomers which contains a reactive group upon each end of the polymer molecule. Expressed in another way the telechelic polymers contain at least 2 terminal reactive groups per molecule. The term "semi-telechelic" is used to refer to a polymer which has a functional group upon only one end of the polymer molecule.

Telechelic polymers have a number of outstanding attributes, one of which being the ease with which the polymer can be molded. Liquid telechelic polymers are readily castable and can be converted into solids on reaction of the polymer with a polyfunctional compound. Soft tacky rubbers can be readily extruded and cured to form products which are quite rigid. It is frequently desirable to plasticize such a polymer in order to obtain greater flexibility in fabricating techniques and conditions. For example, by making a polymer more fluid substantially larger amounts of filler can be incorporated into the polymer prior to curing. One of the disadvantages, however, of using a plasticizer for products of this type is that plasticizers have a tendency to bleed from or migrate within the polymeric structure, either changing the characteristics of the cured product or damaging adjacent materials such as a bonding agent in laminates of such a composition.

I have now discovered a method of preparing a polymer which does not require an added plasticizer by regulating the initiator system used in the polymerization process. In effect, the polymeric composition prepared by the process of my invention has a plasticizing component incorporated in it as a result of the polymerization. The process of my invention comprises contacting a vinylidene-containing monomer under polymerization conditions with a mixture of mono- and polyfunctional organo alkali metal initiators, replacing the alkali metal atoms in the resulting polymer with stable reactive groups and recovering the polymer. The polymer which results from this polymerization method is a mixture of mono- and polyfunctional terminally reactive polymers and the polyfunctional polymer has a molecular weight which is at least about twice that of the monofunctional polymer. The presence of this lower molecular weight monofunctional polymer in the polymeric composition improves the processability of the polymer and also improves the properties of the cured product in certain respects, particularly in low temperature elongation. While I do not wish to be bound by theory on the mechanism of the reaction, it is believed that one end of the plasticizer or monofunctional polymer is tied into the cross-linked structure of the polyfunctional polymer when it is cured with a polyfunctional organic coupling agent and the other end of the polymer remains free to serve as a plasticizer in the cured product or to improve its flexibility or elongation over long periods and particularly at low temperatures. Since the plasticizer or monofunctional polymer is fixed at one end to the cross-linked structure of the cured composition, there is substantially no tendency for this polymer to bleed from or migrate within the composition even when subjected to agents which will ordinarily extract such a low molecular weight material. The self-plasticized compositions of my invention can be used to advantage in the manufacture of items such as shower curtains, tablecloths, raincoats, and the like.

It is an object of my invention to provide a method of preparing a composition of terminally reactive polymers. Another object of my invention is to provide a method of preparing and curing polymers which have improved low temperature properties. Still another object is to provide a method of preparing a polymeric composition which is self-plasticized. Yet another object of my invention is to provide a method of preparing a polymeric composition which is a mixture of polymers having substantially different molecular weights with the molecular weight of each polymer in the mixture being substantially uniform. Other objects, advantages and features of my invention will be apparent to those skilled in the art from the following discussion.

According to my invention an initiator system is used which is a mixture of mono- and polyfunctional organo alkali metal initiators in the polymerization of vinylidene-containing monomers. The resulting polymers contain active alkali metal end groups which can then be reacted with a reagent which replaces these alkali metal groups with more stable functional groups.

The polymers which contain terminally reactive alkali metal atoms can be prepared from a wide variety of monomers. The preferred monomers are the conjugated dienes containing from 4 to 12 carbon atoms per molecule and preferably 4 to 8 carbon atoms per molecule. Examples of these compounds include the following: 1,3-butadiene, isoprene, 2,3-dimethyl-1,3-butadiene, 1,3-pentadiene (piperylene), 3-methyl-1,3-pentadiene, 1,3-heptadiene, 3-butyl-1,3-octadiene, phenyl-1,3-butadiene and the like. Conjugated dienes containing halogen and alkoxy substituents along the chain can also be employed, such as chloroprene, fluoroprene, 2-methoxy-1,3-butadiene, 2-ethoxy-3-ethyl-1,3-butadiene, and 2-ethoxy-3-methyl-1,3-hexadiene. Conjugated dienes can be polymerized alone or in admixture with each other to form copolymers, or block copolymers. Block copolymers can be prepared from two or more conjugated dienes by charging one compound initially, allowing it to polymerize, and then adding a second conjugated diene and allowing it to polymerize. It is preferred that conjugated diolefins be employed in the practice of my invention and preferred monomers are butadiene, isoprene and piperylene.

In addition to the conjugated dienes I can practice my invention with other monomers containing a $CH_2=C<$ group such as the vinyl-substituted aromatic compounds. The vinyl-substituted aromatic compounds include styrene, 1-vinylnaphthalene, 2-vinylnaphthalene, and alkyl, cycloalkyl, aryl, alkaryl, aralkyl, alkoxy, aryloxy, and dialkylamino derivatives thereof in which the total number of carbon atoms in the combined substituents is generally not greater than 12. Examples of these aromatic monomers include: 3-methylstyrene (3-vinyltoluene), 4-n-propylstyrene, 4-dodecylstyrene, 4-cyclohexylstyrene, 2-ethyl-4-benzylstyrene, 4-p-tolylstyrene, 4-(4-phenyl-n-butyl)styrene, 4-methoxystyrene, 3,5-diphenoxystyrene, 4-dimethylaminostyrene, 4-methoxy-6-di-n-propylaminostyrene, 4-5-dimethyl-1-vinylnaphthalene, 8-phenyl-1-vinylnaphthalene, 4-methoxy-1-vinylnaphthalene, 3,6-dimethylamino-1-vinylnaphthalene, and the like. These vinyl-substituted aromatic compounds can be used to form homopolymers or copolymers including block copolymers with each other or with conjugated dienes. The presence of a small amount of polar compound such as the solvent used in preparing the initiator encourages random copolymerization between conjugated dienes and the vinyl-substituted aromatic compounds.

Certain polar monomers can also be polymerized to form homopolymers or copolymers with each other. These polar monomers can be employed to form block coplymers with conjugated dienes and/or vinyl-substituted aromatic compounds. When preparing these block copolymers the polar monomer is introduced after the non-polar monomers have polymerized. A detailed description of block copolymers containing terminal reactive groups and their method of preparation is set forth in the copending application of R. P. Zelinski, Serial No. 796,277, now abandoned, filed March 2, 1959. These polar monomers include vinylpyridines and vinylquinolines in which the vinyl group is attached to a ring carbon other than a carbon in the beta position with respect to the nitrogen. These pyridine, quinoline or isoquinoline derivatives can contain substituents such as alkyl, cycloalkyl, aryl, alkaryl, aralkyl, alkoxy, aryloxy and dialkylamino groups in which the total number of carbon atoms in the combined substituents does not exceed 12. Any alkyl groups on the alpha or gamma carbons with respect to the nitrogen should be tertiary alkyl groups. Examples of polar monomers applicable include: 2-vinylpyridine, 3,5-diethyl-4-vinylpyridine, 3-n-dodecyl-2-vinylpyridine, 5-cyclohexyl-2-vinylpyridine, 4-phenyl-2-vinylpyridine, 3-benzyl-4-vinylpyridine, 6-methoxy-2-vinylpyridine, 4-phenoxy-2-vinylpyridine, 4-dimethylamino-2-vinylpyridine, 2-vinylquinoline, 3-methyl-4-ethoxy-2-vinylquinoline, 3-vinylisoquinoline, 4-phenyl-1-vinylisoquinoline and the like.

Other polar monomers include acrylic and alkacrylic acid esters, nitriles, and N,N-disubstituted amides, such as methyl acrylate, ethyl acrylate, butyl acrylate, methyl methacrylate, ethyl methacrylate, propyl methacrylate, butyl methacrylate, methyl ethacrylate, ethyl ethacrylate, isopropyl ethacrylate, acrylonitrile, methacrylonitrile, N,N-dimethylacrylamide, N,N-diethylmethacrylamide and the like. Vinylfuran and N-vinylcarbazole can also be used.

The terminally reactive polymers are prepared by contacting the monomer or monomers which it is desired to polymerize with a mixture of organo alkali metal initiators. These compounds preferably contain from 1 to 4 alkali metal atoms. Lithium is the preferred alkali metal, particularly for the preparation of polymers of butadiene in which rubbery properties at extremely low temperatures are desired. According to the invention at least one of the initiator compositions in the mixture contains only 1 alkali metal atom per molecule while the initiator mixture also contains polyfunctional compounds containing 2 or more alkali metal atoms per molecule.

The organo alkali metal compounds can be prepared in several ways, for example, by replacing halogens in an organic halide with alkali metals, by direct addition of alkali metals to a double bond, or by reacting an organic halide with a suitable alkali metal compound. Ordinarily the initiator is prepared in a polar solvent such as an ether, for example, diethyl ether.

The organo alkali metal compound initiates the polymerization reaction, the organo radical ordinarily being incorporated in the polymer chain and the alkali metal being attached terminally on at least one end of the polymer chain. When employing polyalkali metal compounds an alkali metal is attached terminally at each end of the polymer chain. The polymers in general will be linear polymers having two ends; however, polymers containing more than two ends can be prepared within the scope of the invention. These polymers can be represented by the general formula $QM_n$ where Q comprises the polymer as previously described, M is an alkali metal and $n$ is an integer of 1 to 4.

The organo alkali metal initiators employed for preparing the polymers can be represented by the formula $RM_x$ where R is a hydrocarbon radical selected from the group consisting of aliphatic, cycloaliphatic and aromatic radicals, M is an alkali metal including sodium, potassium, lithium, cesium and rubidium and $x$ is an integer of 1 to 4. The R in the formula generally contains from 1 to 20 carbon atoms although it is within the scope of the invention to use higher molecular weight compounds. By far the best results are obtained with organolithium compounds which give very high conversions to the terminally reactive polymer. Lithium is, therefore, the preferred alkali metal for the polymerization initiator. Examples of mono- and poly-alkali metal substituted hydrocarbons which can be employed for the polymerization initiator include methyllithium, n-butyllithium, n-decyllithium, phenyllithium, naphthyllithium, p-tolyllithium, cyclohexyllithium, 4-butylphenylsodium, 4-cyclohexylbutylpotassium, isopropylrubidium, 4-phenylbutylcesium, 1,4-dilithiobutane, 1,5-dipotassiopentane, 1,4-disodio-2-methylbutane, 1,10-dilithiodecane, 1,20-dilithioeicosane, 1,4-dilithio-2-methyl-2-butene, 1,4-dipotassio-2-butane, dilithionaphthalene, 4,4'-dilithiobiphenyl, dilithioanthracene, 1,2-dilithio-1,1-diphenylethane, 1,2-dilithio-1,2-diphenylethane, 1,4-dilithiocyclohexane, 1,3,5-trilithiocyclohexane, 1,4-dirubidiobutane, 1,8-dicesiooctane, 1,5-dilithio-3-pentyne, dilithiophenanthrene, 1,2-dilithiotriphenylethane, dilithiomethane, and the like.

Certain specific initiators give better results than others and are preferred in carrying out preparation of the terminally reactive polymers. Lithium adducts of naphthalene, methylnaphthalenes, and anthracene give very good results. A preferred initiator is 1,2-dilithio-1,2-diphenylethane (lithium-stilbene adduct). An initiator which is preferred for the formation of semitelechelic polymers is n-butyllithium. Other preferred initiators for the formation of telechelic polymers are the dilithium adducts of 2,3-dialkyl-1,3-butadienes, e.g., 2,3,-dimethyl-1,3-butadiene, and especially the dilithium adducts of isoprene and 1,3-butadiene wherein the adduct contains from 1 to 7 diene units per molecule.

The amount of initiator which can be used will vary depending on the polymer prepared, and particularly the molecular weight desired. Usually the terminally reactive polymers are liquids, having molecular weights in the range of 1000 to about 20,000. However, depending on the monomers employed in the preparation of the polymers and the amount of initiator used, semi-solid and solid terminally reactive polymers can be prepared having molecular weights up to 150,000 and higher. Usually the initiator is used in amounts between about 0.25 and about 100 millimoles per 100 grams of monomer.

Formation of the terminally reactive polymers is generally carried out in the range of between $-100$ and $+150°$ C., preferably between $-75$ and $+75°$ C. The particular temperature employed will depend on both the monomers and the initiators used in preparing the polymers. For example, it has been found that the organolithium initiators provide more favorable results at elevated temperatures whereas lower temperatures are required to effectively initiate polymerization to the desired products with the other alkali metal compounds. The amount of catalyst employed can vary but is preferably in the range of between about 1 and about 40 millimoles per 100 grams of monomers. It is preferred that the polymerization be carried out in the presence of a suitable diluent which is predominantly hydrocarbon, such as benzene, toluene, cyclohexane, methylcyclohexane, xylene, n-butane, n-hexane, n-heptane, isooctane, and the like. Generally the diluent is selected from hydrocarbons, e.g., paraffins, cycloparaffins, and aromatics containing from 4 to 10 carbon atoms per molecule. It should be understood that relatively small amounts of other materials can be present, such as the ethers in which the initiator was dissolved, or a polar compound which is charged to encourage random copolymerization.

In my invention, a mixture of initiators is used in order to provide a polymer which is essentially a mixture of mono- and polyfunctional terminated polymers. The total amount of initiator employed is as set forth above since the total amount of initiator, both mono- and polyfunctional, determines the actual molecular weights of the mono- and polyfunctional polymers. The mono- and polyfunctional initiators can be employed in any desired proportion. It is preferred, however, to use these initiators in such a manner that in the finished product there is about 25 to 95 parts by weight of the polyfunctional polymer per 100 parts of the composition and about 5 to 75 parts by weight of the monofunctional polymer. Preferably, the invention is practiced so that the resultant composition contains about 70 to 95 parts by weight of the telechelic polymer and from about 5 to 30 parts of the semi-telechelic polymer per 100 parts of the total mixture, exclusive of other materials which may be added, such as fillers, pigments, auxiliary curatives and antioxidants or the like.

Relative amounts of initiator employed to achieve a finished product giving the proportions of polymer in the desired range can readily be determined and are dependent upon the number of alkali metal atoms in the polyfunctional initiator. For example, if a dilithium initiator is employed in conjunction with a monolithium initiator, the polymeric composition will contain difunctional polymer having about twice the molecular weight of the monofunctional polymer. The amount of difunctional polymer on a weight basis will depend upon the relative amount of the difunctional initiator employed. Since two active lithium atoms are present, only half as much proportionally of the difunctional initiator is needed to produce the desired weight proportion of the difunctional polymer. In general, it can be said that with $RLi_x$ representing the polyfunctional initiator where lithium is the alkali metal employed, $x$ is an integer of 2 to 4, and R is as previously defined and RLi represents the monofunctional polymer, the mole ratio of $RLi_x$ per mole of RLi is in the range of about $95/5x$ to $25/75x$. Preferably, the range for this ratio is about $95/5x$ to $70/30x$. For example, if it is desired to produce a polymeric composition containing about 50 parts by weight of the difunctional polymer and about 50 parts by weight of the monofunctional polymer in 100 parts of total composition, the initiators should be charged in a ratio of 25 moles of difunctional initiator to 50 moles of monofunctional initiator. In order to obtain good control over the relative amounts of the poly- and monofunctional polymer obtained, it is preferred that the activity of each alkali metal of the initiators be approximately equal. A very efficient combination is butyllithium and a dilithium isoprene adduct. Examples of other suitable combinations of initiators are: lithium-methylnaphthalene-isoprene and n-butyllithium; lithium-naphthalene-isoprene and n-butyllithium; lithium-dichloronaphthalene and n-butyllithium; lithium-dichloronaphthalene-butadiene and n-butyllithium; lithium-dimethylbutadiene and n-butyllithium; lithium-stilbene-dimethylbutadiene and isobutyllithium; and lithium-naphthalene-dimethylbutadiene and n-amyllithium.

More than two initiators can be used at once, for example, lithium dichloronaphthalene complex, lithium dimethylbutadiene adduct, and n-butyllithium; or lithium chloronaphthalene adduct, lithium methylnaphthalene-isoprene adduct, and n-butyl lithium. The adducts of lithium and dichloro- or chloronaphthalene are tetra- and trifunctional, respectively, whereas the other adducts are difunctional. Isobutyllithium, n-butyllithium, and n-amyllithium are all monofunctional. Many other combinations can be made from the list of initiators previously given.

At the end of the polymerization the telechelic and semi-telechelic polymers contain an alkali metal atom on both ends or one end, respectively, of the polymer chain and the organic radical of the initiator is usually present in the polymer chain. These reactive polymers are then treated with reagents to introduce various reactive groups in place of the alkali metal atoms. While these alkali metal atoms themselves are reactive they are relatively unstable since in the presence of moisture they are rapidly converted to produce polymers containing an inactive hydrogen in place of the alkali metal. Various reagents can be used to place reactive groups on the ends of the polymer molecule thereby producing stable telechelic polymers which can be conveniently processed and cured at the most opportune time. A wide variety of reactive groups is possible in the telechelic polymers of this type. One of the most practical classes of terminally reactive groups contains reactive hydrogen, for example, hydrogen attached to oxygen, sulfur or nitrogen. Examples of such groups containing reactive hydrogen include:

$$-OH, -SH, -\underset{\underset{O}{\|}}{C}-OH, -\underset{\underset{S}{\|}}{C}-SH, -SO_3H, -SO_2H, -SOH$$

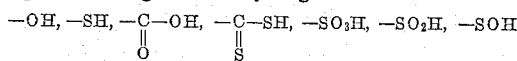

Other such end groups include phosphinic or thiophosphinic acid end groups and other acidic groups such as $POOH$, $SeO_2H$, $SeO_3H$, $SiO_2H$, $SnO_2H$, $SbO_2H$, $SbOH$, $SbO_2H_2$, $TeO_2H$, $TeO_3H$, $AsO_2H$, $AsOH$, $AsO_3H_2$, $AsO_3H_3$. Examples of other reactive groups are those containing a reactive halogen in which the halogen is attached to carbon or sulfur with the carbon carrying the halogen being singly bonded to oxygen or sulfur, multiply bonded to oxygen or sulfur or alpha to a carbonyl group, a thiono group

an ethenylene group

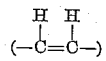

or a carbon group in an aromatic ring. Examples of end groups of this type include:

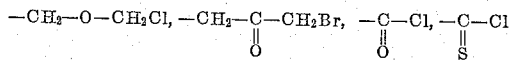

$-SCl$, and $CH_2-S-CH_2Cl$

Examples of other reactive end groups are those containing reactive double or triple bonds, for example, an oxygen, sulfur or nitrogen attached to carbon by a multiple bond. Examples of these reactive groups include: cyano

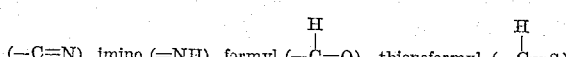

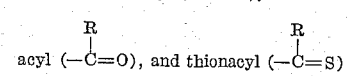

wherein R is a hydrocarbon radical.

A number of different methods can be used to substitute reactive groups of the above type for the alkali metal atoms on the ends of the polymer chain. For example, the alkali metal telechelic polymer can be reacted with carbon dioxide and thereafter with an acid such as hydrogen chloride to produce a polymer containing terminal carboxy groups. Sulfuryl chloride can be used to produce polymers containing terminal SO₃H groups. Other reactants which can be employed to replace the alkali metal atoms with reactive groups are carbon disulfide, sulfur dioxide, disodium chlororesorcinate, acetone, methyl ethyl ketone, phenyl methyl ketone, benzyl ethyl ketone, p-tolyl n-propyl ketone, acetyl chloride, propionyl chloride, butyryl bromide, benzoyl chloride, α-cyclohexylacetyl chloride, ethyl acetate, methyl propionate, cyclohexyl butyrate, ethyl benzoate, phenyl acetate, p-tolyl propionate, 2-butenyl acetate, dimethyl formamide, dimethyl acetamide, diethyl benzamide, diphenyl formamide, diethyl 3-cyclohexylpropionamide, methyl chloromethyl ketone, propyl bromoethyl ketone, phenyl chlorophenyl ketone, cyclohexyl bromopropyl ketone, acetonitrile, propionitrile, butyronitrile, 2-cyclohexylacetonitrile, benzonitrile, p-methyl benzonitrile, ethyl isocyanide, n-butyl isocyanide, n-decyl isocyanide, 2-(4-methylcyclohexyl)ethyl isocyanide, methyl isocyanate, propyl isocyanate, phenyl isocyanate, benzyl isocyanate, p-tolyl isocyanate, n-pentyl isothiocyanate, 2-hexyl isothiocyanate, butenyl isothiocyanate, xylyl isothiocyanate, benzoquinone, 2-methylbenzoquinone, 4-bromocyclohexanone, ketene, ethylketene, phenylketene, cyclohexylketene, and the like. Cyclic disulfides can be employed to prepare mercapto telechelic polymers and phosphonic dihalides or thiophosphonic dihalides can be employed to prepare the polymers containing terminal phosphinic or thiophosphinic acid end groups. Epoxy compounds can be employed to prepare polymers containing terminal hydroxy groups, and polymers containing terminal alkali metal atoms can be reacted with compounds containing the structure

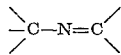

to prepare polymers containing terminal nitrogen groups which are active in quaternizing reactions. Polymers containing terminal aziridinyl groups can be prepared by reacting the alkali metal terminated polymers with polyfunctional aziridinyl compounds of the type to be described later.

As a modification of the invention, polymeric compositions can be produced which contain a controlled amount of non-functional polymer by including with the terminating agent a minute but measured amount of a material which will replace alkali metal atoms on the polymer with hydrogen, such as water, alcohol, or acid.

After modification of the polymer to a stable terminally reactive form the polymer is recovered from the reaction medium. Alkali metal atoms remaining in the polymer can be replaced by hydrogen atoms by hydrolysis or reaction with an acid or alcohol of mixtures thereof. The usual techniques of recovery for solution polymers can be used.

The polymeric compositions thus formed can be mixed with fillers and cured with any polyfunctional organic compound which will react with the terminal groups to couple the polymer molecules. For example, with polymers containing terminal acidic groups such as carboxy groups, the curatives found to be most effective are the aziridinyl compounds such as the triaziridinyl phosphine oxides or sulfides or the multi-functional aziridinyl-substituted triazines or triphosphatriazines. By "polyfunctional" we mean containing 3 or more functional groups per molecule. In general, polyfunctional alcohols, acids, halides, amines, ketones, triisocyanates, epoxides, and the like, can be employed. The organic radicals of the organo polyfunctional compounds are preferably selected from aliphatic, cycloaliphatic or aromatic hydrocarbon radicals containing anywhere from 1 to 36 carbon atoms. Conventional curing agents can be employed as auxiliary curatives, for example, those curatives known to react by cross linking across the double bonds of the diene polymer. Examples of such conventional curatives include sulfur and sulfur compounds, peroxides such as benzoyl peroxide and dicumyl peroxide, and the like. Radiation such as ultraviolet or ionizing radiation can also be employed to bring about the curing reaction. Curing time and temperature can vary broadly, for example, from about 5 minutes to 100 hours or more between —100 to 500° F., preferably about 100 to 350° F.

Examples of polyfunctional organic coupling agents include glycerol, 1,2,3-trihydroxybutane, erythritol, mannitol, gallic acid, hemimellitic acid, trimeric acid, mellitic acid, pyromellitic dianhydride, triethylenetetramine, tetraethylenepentamine, 1,3,5-trichlorobenzene, 1,2,4-trichlorobutane, benzene-1,3,5-triisocyanate, polyarylpolyisocyanate having an average of 3 isocyanate groups per molecule and a molecular weight of about 380 (PAPI 1, a product of Corwin Chemical Company) 2,4,6-heptanetrione, 1,4,9,10-anthracenetetrone, and the like.

Although polyfunctional coupling agents are preferred the invention can be practiced with difunctional curatives, particularly where a reactive group is formed or remains at the side of coupling to permit further chain extension or cross linking after reaction involving a semi-telechelic molecule. This applies to the aziridinyl compounds which react with the acidic groups of the polymer and form an amine at the coupling site which can then become involved in further coupling reactions.

In a preferred aspect of our invention acidic telechelic polymers, and most preferably carboxy telechelic polymers which have been plasticized with an acidic or carboxy semi-telechelic polymer, are cured by coupling reactions with the polyaziridinyl compounds. The triaziridinyl phosphine oxides or sulfides are typical of compounds used in this type of curing reaction and these are represented by the formula:

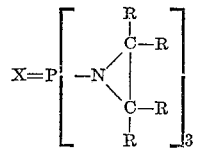

wherein X is selected from the group consisting of oxygen and sulfur, P is phosphorous, and each R is a radical selected from the group consisting of hydrogen, alkyl, cycloalkyl and aryl radicals and composites thereof such as alkaryl, aralkyl and the like and the total R's of each aziridinyl group containing up to a total of 20 carbon atoms. Specific phosphine oxide and sulfide reactants which can be used include: tri(1-aziridinyl)phosphine oxide, tri(2-methyl-1-aziridinyl)phosphine oxide, tri(2,2-dimethyl-1-aziridinyl)phosphine oxide, tri(2-methyl-3-ethyl-1-aziridinyl)phosphine oxide, tri(2-ethyl-3-decyl-1-aziridinyl)phosphine oxide, tri(2-eicosyl-1-aziridinyl) phosphine oxide, tri(2-methyl-3-cyclopentyl-1-aziridinyl) phosphine oxide, tri(2 - phenyl-1-aziridinyl)phosphine oxide, tri[2 - ethyl-3-(1-naphthyl)1-aziridinyl]phosphine oxide, tri(2-nonyl-3-benzyl-1-aziridinyl)phosphine oxide, tri[2-n-propyl-3-(2-phenylethyl)-1 - aziridinyl]phosphine oxide, tri[2 - heptyl-3-(2,4-dimethylphenyl)1-aziridinyl]-phosphine oxide, tri(2-methyl-1-aziridinyl)phosphine sulfide, tri(2-methyl-3-cyclohexyl-1-aziridinyl)-phosphine sulfide, tri(2-phenyl-1-aziridinyl)phosphine sulfide, and tri(2-amyl-3-benzyl-1-aziridinyl)phosphine sulfide.

Examples of other polyfunctional aziridinyl compounds are the aziridinyl-substituted triazines and triphosphatriazines, for example, the 1-aziridinyl-1,3,5-triazines and the 1-aziridinyl-2,4,6-triphospha-1,3,5, - triazines represented by the formulas:

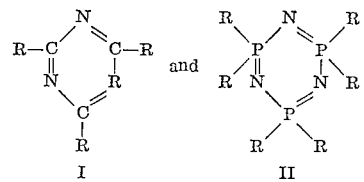

I    II wherein each R is a radical at least two of which in each formula are 1-aziridinyl radicals as defined above the phosphine oxides and sulfides and the remainder are selected from the group consisting of said 1-aziridinyl radicals, hydrogen, alkyl, cycloalkyl and aryl radicals and combinations thereof, each hydrocarbon radical containing from 1 to 12 carbon atoms.

Examples of compounds represented by Formula I include the following:

2,4,-di(1-aziridinyl)1,3,5-triazine,
2-methyl-4,6-di(1-aziridinyl)1,3,5-triazine,
2,4,6-tri(1-aziridinyl)1,3,5-triazine,
2,4,6-tri(2-methyl-1-aziridinyl)1,3,5-triazine,
2,4,6-tri(2-methyl-3 - ethyl - 1 - aziridinyl)1,3,5 - triazine,
2,4,6-tri(2-ethyl-3-octadecyl-1-aziridinyl)1,3,5-triazine,
2,4,6-tri(2-methyl-3-cyclopentyl - 1 - aziridinyl)1,3,5 - triazine,
2,4,6-tri(2-phenyl-1-aziridinyl)1,3,5,-triazine,
2,4,6-tri(2,3-diphenyl-1-aziridinyl)1,3,5-triazine,
2,4,6-tri[2-n-propyl-3-(2-phenylethyl)1 - aziridinyl]1,3,5-triazine,
2,4,6-tri[2-methyl - 3 - (4 - methylphenyl) - 1 - aziridinyl]1,3,5-triazine and the like.

Examples of compounds represented by Formula II are:

2,4,-di(1-aziridinyl)2,4,6-triphospha-1,3,5- triazine,
2,4,6-tri(1-aziridinyl)2,4,6-triphospha-1,3,5-triazine,
2,4,6-tri(2-methyl-3-n-butyl-1-aziridinyl)2,4,6-triphospha-1,3,5-triazine,
2,4,6-tri(2-ethyl-3-cyclohexyl-1-aziridinyl)2,4,6-triphospha-1,3,5-triazine,
2,4,6-tri[2-n-propyl-3-(2-phenylethyl)1-aziridinyl]2,4,6-triphospha-1,3,5-triazine,
2,4,6-tri[2-heptyl-3-(2,4-dimethylphenyl)1-aziridinyl]2,4,6-triphospha-1,3,5-triazine,
2,2,4,4,6,6-hexa(2-methyl-1-aziridinyl)2,4,6-triphospha-1,3,5-triazine,
hereinafter referred to as hexa-2-methyl-1-aziridinyl-triphospha-triazine,
2,2,4,6-tetra(2-hexyl-1-aziridinyl)2,4,6-triphospha-1,3,5-triazine and the like.

Other difunctional aziridinyl compounds which can be employed are defined by the formula:

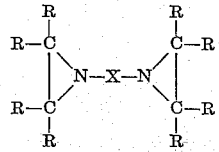

wherein X is selected from the group consisting of carbonyl, phenyl phosphoryl, phenyl thiophosphoryl, sulfoxyl or sulfonyl and each R is as defined above for the aziridinyl radical of the phosphine oxides. In a preferred species X is phenyl phosphoryl or sulfoxyl attached to (2-methyl-1-aziridinyl) groups. Examples of these difunctional aziridinyl compounds are:

phenyl-bis(2-methyl-1-aziridinyl)phosphine sulfide,
phenyl-bis(2-methyl-1-aziridinyl)phosphine oxide,
phenyl bis(2-ethyl-1-aziridinyl)phosphine oxide,
phenyl-bis(2-methyl-3-ethyl-1-aziridinyl)phosphine oxide,
phenyl-bis(2-butyl-1-aziridinyl)phosphine oxide,
bis(2-methyl-1-aziridinyl)sulfoxide,
bis(2-propyl-1-aziridinyl)sulfoxide,
bis(2-methyl-3-propyl-1-aziridinyl)sulfoxide,
(2-methyl-1-aziridinyl-2-butyl-1-aziridinyl)-sulfoxide,
bis(1-aziridinyl)sulfone,
bis(2-methyl-1-aziridinyl)sulfone,
bis(2-ethyl-1-aziridinyl)sulfone,
bis(2-propyl-1-aziridinyl)sulfone,
bis(2-ethyl-3-propyl-1-aziridinyl)sulfone,
(2-methyl-1-aziridinyl-2-ethyl-1-aziridinyl)sulfone,
bis(1,2-propylene)-1,3-urea, bis(1,2-pentylene)-1,3-urea,
bis(4,5-octylene)-1,3-urea and the like.

Other difunctional compounds can be used such as ethylene or diethylene glycol bis(1,2-propylene)carboxamides,
di-1(2-methyl-1-aziridinyl)-propanol-2,
bis(1,2-propylene)adipamide,
bis(1,2-propylene)benzene-m-disulfonamide,
bis(1,2-propylene)terephthalamide and the like.

Examples of other tri-functional organic coupling agents are polyepoxy compounds, such as those which contain at least 3 oxirane groups

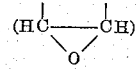

these groups being units in an open chain hydrocarbon chain or as branches therefrom. Examples of such compounds are triepoxyhexane, triepoxydecane, 2,3-6,7-11,12-triepoxydodecane, 2,3-5,6-diepoxy-9-epoxy ethyldodecane, pentaepoxyeicosane, 2,3-5-triepoxy ethyl-9-10-epoxyhexadecane, and the like. In these compounds the percent epoxy oxygen will usually exceed 0.5 percent and will preferably be in the range of from 2 to 12 percent or higher. A particularly useful compound of this class is a liquid epoxidized polybutadiene containing 3 or more epoxy groups per molecule. These materials which comprise a preferred species can be prepared by treating a liquid polymer of butadiene with a peracid, such as performic or peracetic acid. Rubbery solids can be prepared using from 1 to 10 equivalents of the epoxy compound based on equivalents of the epoxy groups present per carboxy group equivalent present in the carboxy terminated polymers.

A wide variety of products can be produced according to the method of this invention. Compounds such as potting compounds and caulking compounds, molded items, various laminated structures, and binders for various types of solids can be made. Since the polymers can be quite fluid in the uncured state many fabrication problems ordinarily attending the manufacture of rubbery products are absent. In order to illustrate further the advantages of our invention the following examples are presented. The proportions and conditions in these examples are given as being typical only and should not be construed to limit our invention unduly.

EXAMPLE I

A dilithium initiator was prepared by reacting lithium containing 2 weight percent sodium with isoprene. The recipe was as follows:

| | |
|---|---|
| Isoprene, mole | 0.40 |
| Lithium wire (2 wt. percent Na), gram atoms | 1.2 |
| Diethyl ether, ml. | 200 |
| Temperature, °F. | 40 |
| Time, hours | 24 |
| Total alkalinity, normality | 0.58 |
| $n^1$ | 5.7 |

[1] A calculated value which represents the number of isoprene units in the initiator molecule, i.e., Li($C_5H_8$)$_n$Li.

The reaction was carried out in an atmosphere of nitrogen. The mixture was agitated during the 24-hour period. At the end of this time, a sample was withdrawn and titrated with 0.1 N hydrochloric acid. Maximum normality was calculated assuming complete conversion of the diene, two lithium atoms reacting per molecule of diene. From the normality determined by titration and maximum normality previously calculated, the average number of diene units per two lithium atoms was calculated, assuming complete conversion of the diene. This value is represented by $n$ given above and is an approximate value but is indicative of the nature of the reaction.

Approximately 85 percent of the ether was removed from the reaction mixture by purging it with nitrogen at room temperature. Toluene was added to redissolve the residue. Titration of this solution with 0.1 N hydrochloric acid showed it to be 0.2 molar (0.4 normal).

Butadiene was polymerized in a series of runs using a mixed initiator system comprising the lithium-isoprene adduct hereinbefore described and n-butyllithium. One run was made using only the lithium-isoprene adduct. The recipe was as follows:

| | Parts by weight |
|---|---|
| 1,3-butadiene | 100 |
| Cyclohexane | 780 |
| Lithium-isoprene adduct | Variable |
| n-Butyllithium | Variable |
| Temperature, °F. | 122 |
| Time, hours | 1.5 |
| Conversion, percent | 100 |

Cyclohexane was charged first after which the reactor was purged with nitrogen. Butadiene was then added followed by the butyllithium and finally the lithium-isoprene adduct.

At the end of the reaction, the unquenched polymer solution was carbonated using a T-tube. Polymer solution was transferred from the reactor into one arm of the T-tube by nitrogen under a pressure of about 20 p.s.i.g. Simultaneously carbon dioxide under pressure was introduced through a separate arm of the tube. An instantaneous reaction occurred upon contact of the carbon dioxide with the polymer solution. The reaction mixture was acidified with dilute hydrochloric acid in isopropyl alcohol, the acid and lithium salt were removed by washing the solution with water, and 0.5 weight percent, based on the polymer, of 2,2'-methylene-bis(4-methyl-6-tert-butylphenol) was added as an antioxidant. The polymer was recovered by evaporation of the solvent. Results of the several runs are shown in the following table:

Based on the foregoing discussion, mathematical equations can be derived to show the relationship between the initiator concentrations (on a mole basis) and the weight percent and approximate molecular weight of both telechelic and semi-telechelic polymers in the composition.

$A$ = concentration of dilithium initiator (moles per 100 grams monomer)

$B$ = concentration of monolithium initiator (moles per 100 grams monomer)

$2A+B$ = total active centers for reaction $2A/2A+B$ (100) = wt. percent active centers from telechelic initiator (C)

$B/2A+B$ (100) = wt. percent active centers from semi-telechelic initiator (D)

Since initiator quantities are based on 100 parts monomers, the weight percents designated as C and D are also the weight amounts of telechelic and semi-telechelic polymers formed from the 100 parts of monomer charged.

$C/A$ + weight of organic moiety of initiator + 2COOH
= molecular weight of telechelic polymer.

$D/A$ + weight of organic moiety of initiator + COOH
= molecular weight of semi-telechelic polymer.

EXAMPLE II

Butadiene was polymerized in accordance with the following recipe:

| | |
|---|---|
| 1,3-butadiene, parts by weight | 100 |
| Cyclohexane, parts by weight | 1000 |
| Lithium-isoprene adduct, millimoles [1] | 25 |
| Temperature, °F. | 122 |
| Time, hours | 1.5 |
| Conversion, percent | 100 |

[1] Adduct prepared as described in Example I.

| Run No. | Li-Isoprene Adduct, Mmoles | Butyl-lithium, Mmoles | C/D [1] | Calculated Mol. Wt. of Polymers | | Brookfield Visc., Poises at 77° F. | COOH, percent |
|---|---|---|---|---|---|---|---|
| | | | | Telechelic | Semi-Telechelic | | |
| 1 | 25 | 0 | 100/0 | 4,477 | | 508 | 1.65 |
| 2 | 18.8 | 3.1 | 92.4/7.6 | 5,387 | 2,750 | 332 | 1.55 |
| 3 | 15 | 5 | 85.7/14.3 | 6,187 | 2,962 | 284 | 1.30 |
| 4 | 18.8 | 6.3 | 85.7/14.3 | 5,037 | 2,372 | 226 | 1.56 |
| 5 | 15 | 10 | 75/25 | 5,377 | 2,602 | 154 | 1.48 |

[1] Calculated weight ratio telechelic/semi-telechelic polymer in composition.

According to the calculated molecular weights, the data show that the polymers prepared with the butyllithium initiator had lower molecular weights than those prepared with the dilithium initiator. As the portion of butyllithium polymer in the composition increased, the viscosity of the composition decreased, indicating that this polymer served as a built-in plasticizer for the telechelic polymer.

A further study of the data shows that more lithium was present in the control run (run 1) than was present in any of the other runs but the viscosity was the highest of the series. The amount of lithium present in each run, expressed as gram atoms per 100 grams monomer, was 0.050, 0.041, 0.035, 0.044, and 0.040, respectively.

When calculating the weight ratios of telechelic/semi-telechelic polymers in each composition and also the molecular weights of the respective polymers, it is first recognized that the basic reaction mechanisms for preparing telechelic and semi-telechelic polymers are identical. Assuming that the rates of initiation of the two initiators are equal, the rate of propagation of the dilithium system is double that of the monolithium system, i.e., since the telechelic initiator has two active centers, it will consume monomer twice as fast as the monolithium initiator.

The polymer was carbonated and recovered in the manner described in Example I. This product was a liquid carboxy telechelic polymer.

A polymer composition comprising telechelic and semi-telechelic polymers was prepared using the recipe of run 4, Example I. Brookfield viscosity, vinyl content, and carboxy content of the two polymers were as follows:

| | Di-COOH+ Mono-COOH Polymer | Di-COOH Polymer |
|---|---|---|
| Brookfield viscosity at 77° F., poises | 245 | 600 |
| COOH, percent | 1.43 | 1.46 |
| Vinyl content, percent | 17.5 | 18.5 |

Compositions were prepared from each of the foregoing polymers using 80/20 weight proportions of ammonium perchlorate and binder. The ammonium perchlorate was a blend containing 56 parts by weight of material having an average particle size of 200 microns and 24 parts by weight of material having an average particle size of 18 microns. The liquid carboxy-containing polymers described above, in admixture with one or more curatives, were used as binders. The total amount of curvative in each case was 1.1 equivalents (110 percent of stoichiometric) based on the carboxy content. The compositions were cured 96 hours at 160° F. and physical properties determined at different temperatures. The runs are summarized in the following table:

DI-COOH+MONO-COOH COMPOSITIONS

| Run No. | Curative | | Temp., °F. | $S_m$,[1] p.s.i. | $\epsilon_m$,[2] percent | E,[3] p.s.i. |
|---|---|---|---|---|---|---|
| | Type | Equivalents | | | | |
| 1 | MAPO [4] | 1.1 | 170 | 78 | 27.9 | 440 |
| | | | 75 | 126 | 45.0 | 550 |
| | | | -40 | 398 | 56.0 | 3,100 |
| | | | -70 | 556 | 22.8 | 6,900 |
| | | | -90 | 713 | 9.1 | 15,000 |
| 2 | MAPO+φMAPO [5] | 0.66+0.44 | 170 | 47 | 141.3 | 190 |
| | | | 75 | 102 | 98.2 | 560 |
| | | | -40 | 437 | 79.6 | 3,500 |
| | | | -70 | 565 | 26.0 | 7,500 |
| | | | -90 | 660 | 9.1 | 13,000 |

DI-COOH COMPOSITIONS—CONTROLS

| Run No. | Curative | | Temp., °F. | $S_m$,[1] p.s.i. | $\epsilon_m$,[2] percent | E,[3] p.s.i. |
|---|---|---|---|---|---|---|
| | Type | Equivalents | | | | |
| 3 | MAPO | 1.1 | 170 | 89 | 11.7 | 1,100 |
| | | | 75 | 138 | 16.7 | 1,400 |
| | | | -40 | 391 | 24.3 | 4,600 |
| | | | -70 | 586 | 13.8 | 9,200 |
| | | | -90 | 716 | 7.2 | 18,000 |
| 4 | MAPO+φMAPO | 0.66+0.44 | 170 | 99 | 28.1 | 720 |
| | | | 75 | 178 | 28.1 | 1,500 |
| | | | -40 | 458 | 23.4 | 5,100 |
| | | | -70 | 590 | 13.6 | 8,800 |
| | | | -90 | 733 | 7.8 | 17,000 |

[1] Tensile strength.
[2] Elongation at maximum stress.
[3] Young's modulus of elasticity.
[4] Tri(2-methyl-1-aziridinyl)phosphine oxide.
[5] Phenyl-bis(2-methyl-1-aziridinyl)phosphine oxide.

A comparison of runs 1 and 3, and also runs 2 and 4, shows that the compositions containing the blends of mono- and dicarboxy polymers have better overall elongation and lower modulus than the compositions containing only the dicarboxy polymer. Lower modulus indicates lower stress for a given elongation. In addition to the foregoing advantages, the polymer blend compositions had much better castability than the other compositions.

As will be apparent to those skilled in the art, various modifications can be made in this invention without departing from the spirit or scope thereof.

I claim:

1. A process for making a polymer which comprises contacting a vinylidene-containing monomer selected from the group consisting of conjugated dienes having 4 to 12 carbon atoms per molecule, vinyl-substituted aromatic compounds, vinylpyridines, vinylquinolines, acrylic and alkacrylic acid esters, acrylonitrile, methacrylonitrile, N,N-disubstituted amides, vinylfuran and N-vinylcarbazole under polymerization conditions with a mixture of mono- and polyfunctional organo alkali metal initiators having the formulas RM and $RM_x$ where each R is selected from the group consisting of aliphatic, cycloaliphatic and aromatic hydrocarbon radicals having 1 to 20 carbon atoms, M is an alkali metal and x is an integer of 2 to 4, replacing the alkali metal atoms in the resulting polymer was stable reactive groups, and recovering the polymer.

2. A process for making a curable polymer with improved processability which comprises contacting a conjugated diene having from 4 to 12 carbon atoms per molecule with a mixture of an organic monolithium initiator having the formula RLi and an organo polylithium initiator having the formula $RLi_x$ where each R is selected from the group consisting of aliphatic, cycloaliphatic and aromatic hydrocarbon radicals having 1 to 20 carbon atoms and x is an integer of 2 to 4 under polymerization conditions, replacing the lithium atoms in the resulting polymer with stable reactive groups, and recovering the polymers.

3. The process of claim 2 wherein said stable reactive groups are carboxy groups.

4. A process for making a curable polymer with improved processability which comprises contacting a conjugated diene having 4 to 12 carbon atoms per molecule with an initiator system in hydrocarbon solvent under polymerization conditions, said initiator system including at least one compound having the formula RLi and at least one material having the formula $RLi_x$ wherein R is selected from the group consisting of aliphatic, cycloaliphatic and aromatic hydrocarbon radicals having 1 to 20 carbon atoms and x is an integer of 2 to 4, contacting the resulting polymer in solution with carbon dioxide, and recovering the polymeric composition containing carboxy groups.

5. The process of claim 4 wherein said initiator system is n-butyl-lithium and dilithium-isoprene adduct.

6. The process of claim 4 wherein said initiator system is n-butyllithium and dilithium-methylnaphthalene-isoprene adduct.

7. The process of claim 4 wherein said initiator system is isobutyllithium and dilithium-stilbene-dimethyl-butadiene adduct.

8. The process of claim 4 wherein said initiator system is n-amyllithium and dilithium-naphthalene-dimethylbutadiene adduct.

9. The process of claim 4 wherein the mole ratio of $RLi_x$ per mole of RLi is in the range of about $95/5x$ to $25/75x$.

10. The process of claim 4 wherein said conjugated diene is 1,3-butadiene.

11. The process of claim 4 wherein said resulting polymer in solution is also contacted with a small amount of material selected from the group of material selected from the group consisting of water, alcohol and acid.

12. A process for making a rubbery product with improved low temperature properties which comprises contacting a conjugated diene having 4 to 8 carbon atoms per molecule with an initiator system in hydrocarbon solvent under polymerization conditions, said initiator system being a mixture of mono- and polylithium organic materials having the formulas RLi and $RLi_x$, respectively, wherein R is selected from the group consisting of aliphatic, cycloaliphatic, and aromatic hydrocarbon radicals having 1 to 20 carbon atoms and x is an integer of 2 to 4, thereby producing a solution of mono- and polyfunctional polymer, contacting said solution of polymer with carbon dioxide, recovering a polymeric composition containing terminal carboxy groups, and reacting said composition with a polyaziridinyl compound.

13. The process of claim 12 wherein said conjugated diene is 1,3-butadiene, said RLi is n-butyllithium, said $RLi_x$ is dilithium isoprene adduct, and said polyaziridinyl compound is tri(2-methyl-1-aziridinyl)phosphine oxide.

14. A process for making a polymer which comprises contacting monomer selected from the group consisting of conjugated dienes having 4 to 12 carbon atoms per molecule, vinyl-substituted aromatic compounds, vinylpyridines, vinylquinolines, acrylic and alkacrylic acid esters, acrylonitrile, methacrylonitrile, N,N-disubstituted amides, vinylfuran and N-vinylcarbazole under polymerization conditions with a mixture of compounds having the formulas RM and $RM_x$ where each R is selected from the group consisting of aliphatic, cycloaliphatic and aromatic hydrocarbon radicals having 1 to 20 carbon atoms, M is an alkali metal and $x$ is an integer of 2 to 4, replacing the alkali metal atoms in the resulting polymer with stable reactive groups, and reacting the polymer thus formed with a polyfunctional organic compound thereby coupling the polymer molecules through said reactive groups.

References Cited by the Examiner
UNITED STATES PATENTS

| | | | |
|---|---|---|---|
| 2,146,447 | 2/39 | Scott et al. | 260—94.2 |
| 2,913,444 | 11/59 | Diem et al. | 260—94.2 |

OTHER REFERENCES

Ziegler: "Rubber Chemistry and Technology," vol. 11, pp. 501–507 (1938).

Surrey: "Name Reactions in Organic Chemistry," published by Academic Press Inc., New York, N.Y. (1954); page 176 relied upon.

L. J. BERCOVITZ, *Primary Examiner*.

L. D. ROSDOL, C. D. QUARFORTH, *Examiners*.